United States Patent [19]
Phillips

[11] Patent Number: 4,791,780
[45] Date of Patent: Dec. 20, 1988

[54] ROOF RAKE

[76] Inventor: David X. Phillips, 101 S. Kentucky, Amarillo, Tex. 79106

[21] Appl. No.: 22,053

[22] Filed: Mar. 2, 1987

[51] Int. Cl.[4] ............................................. A01D 7/06
[52] U.S. Cl. .............................. 56/400.04; 56/400.17; 294/52
[58] Field of Search .................... 294/50.6, 50.8, 50.9, 294/51, 52, 55.5, 57–59; 15/143 R; 16/110 R, 111 R; 56/400.01, 400.04–400.06, 400.11, 400.12, 400.16, 400.17, 400.21; 172/371, 374, 375, 378–380

[56] References Cited

U.S. PATENT DOCUMENTS

| | | | |
|---|---|---|---|
| D. 251,583 | 4/1979 | Baylis | 172/375 X |
| 524,215 | 8/1894 | Quigley | 56/400.16 |
| 1,352,386 | 9/1920 | Rundberg | 56/400.16 X |
| 2,045,394 | 6/1936 | Kuhlman | 56/400.16 |
| 2,052,885 | 9/1936 | Lee | 56/400.05 |
| 2,597,954 | 5/1952 | Schaller | 56/400.06 X |
| 3,095,682 | 7/1963 | Pasquine | 56/400.12 |
| 3,299,545 | 1/1967 | Husted | 56/400.06 X |
| 4,477,972 | 10/1984 | Testa | 294/58 X |
| 4,644,740 | 2/1987 | Lee | 56/400.06 X |

FOREIGN PATENT DOCUMENTS

| | | | |
|---|---|---|---|
| 232141 | 3/1911 | Fed. Rep. of Germany | 56/400.16 |
| 357843 | 12/1961 | Switzerland | 15/143 R |

Primary Examiner—Johnny D. Cherry

[57] ABSTRACT

The rake of this invention has an "S" shaped angled handle allowing a person to rake in a forward sweeping motion. Two rows of teeth facing in an opposite direction from one another are necessary so one can use the raking device from the left or right on one's self.

1 Claim, 4 Drawing Sheets

ROOF RAKE

BACKGROUND OF INVENTION

The design of this invention came from having to remove "trash", old shingles, scraps, and waste material etc. from the tops of roofs that are new or being redone.

In order to do this efficiently a device was needed that could work in a forward sweeping motion, like that of a kitchen broom, allowing a person to rake in the direction in which one is facing, so as not to have to put one's back to the edge of the roof.

A conventional leaf type rake (which is currently being used in this manner) is difficult to use due to the fact that a conventional type leaf rake is designed to reach out and pull to one's self, putting one's back in the direction one is raking.

In order to rake facing the edge of the roof I discovered that I had to get the teeth of the rake working in a forward direction. The handle would have to be curved in such a way so that the teeth are setting evenly to the surface beside me, facing in the same direction as myself.

So I put a forty-five degree angle a few inches from one end of a piece of light weight pipe (conduit) about six feet long, and mounted two metal rake heads from a conventional type leaf rake back to back from one another on the end of the pipe with the curve.

In order to get the rake to work in a sweeping motion, I put another curve in the other end of the pipe, going in the opposite direction of the curve at the rake head end of the pipe, giving it an oblong "S" shape. At that end of the rake I shoved a rubber hand grip (such as that on a bicycle) onto it.

In order to operate this invention in a sweeping type motion toward the direction one is facing, I place one hand on the handle grip and the other hand at about the middle of the pipe between each curve, pushing forward with the hand in the middle and pulling back with the hand on the hand grip at the end of the handle, causing the rake head end of the rake to move forward in a sweep motion.

In order to use the rake on one's right side or left side, I made the rake head out of two conventional leaf type rake heads, mounting them back to back to one another giving this invention two rows of teeth protruding out from the main rake head member in an opposite direction from one another.

SUMMARY OF THE INVENTION

The invention of the "Roof Rake" has become an excellent tool in the use of safely clearing off roofs of old shingles, waste materials, scraps, etc. and also works quite efficiently on the ground clearing an area of trash, waste materials, leaves, clippings etc. A person can rake all the way around one's self without having to move or bend over.

BRIEF DESCRIPTION OF THE DRAWINGS

FIGS. 4A and 4B are front views of the invention showing its need for two rows of teeth.

DETAILED DESCRIPTION OF THE INVENTION

Figure 1:
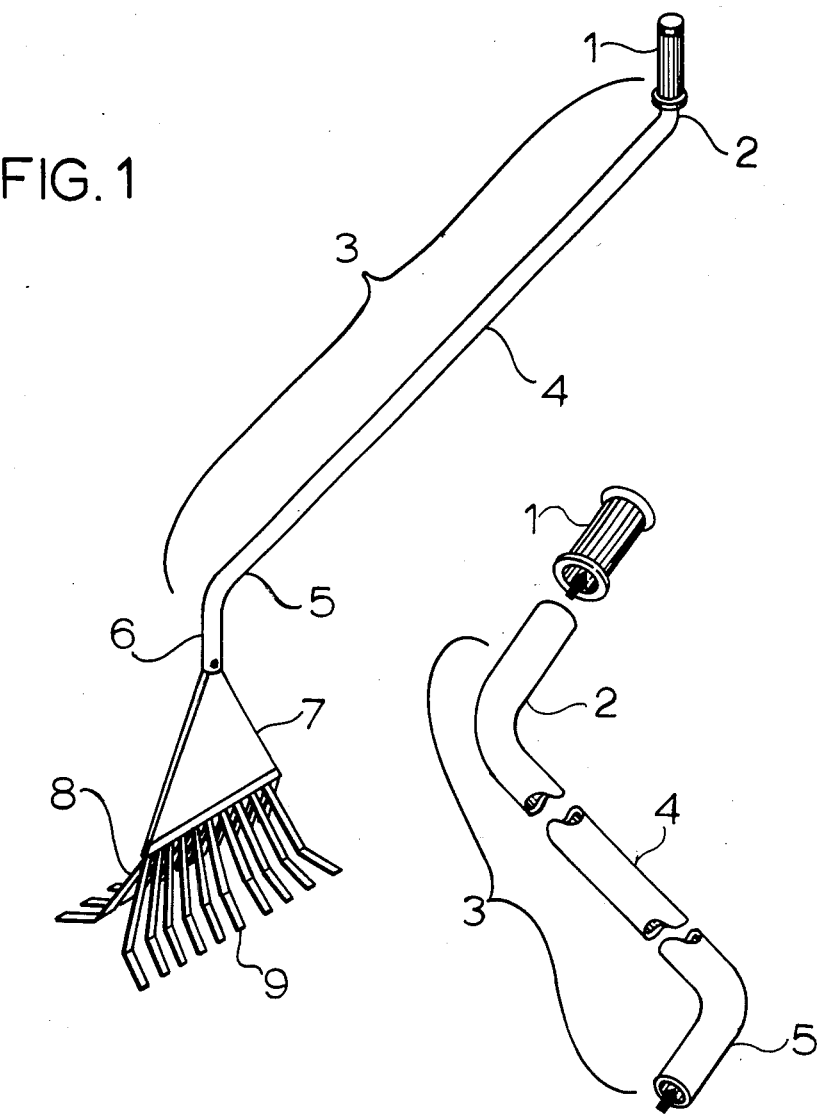
FIG. 1 is an isometric view of the Roof Rake invention.
Figure 2:
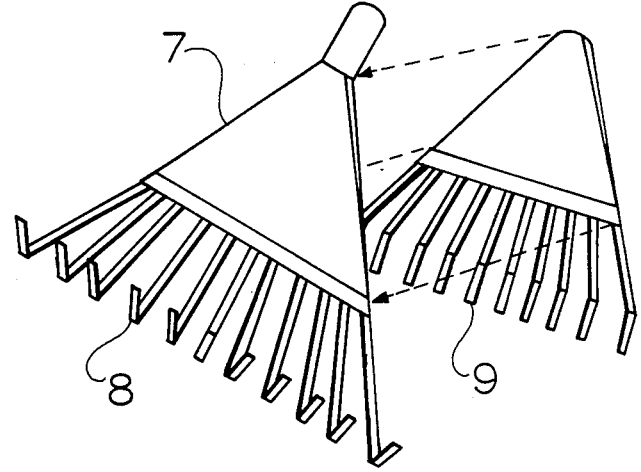
FIG. 2 is an exploded perspective view of the said invention.

Referring now to FIG. 1 and FIG. 2 of the drawings for the purpose of illustrating this invention, there is seen a hand grip 1 at one end of the handle 3 just above curve 2. The other position of hand placement on the handle 3 is in area 4 between the two curves 2 and 5. A few inches below curve 5 at the end of the handle 3 is where rake head 7 is mounted and held by a holding screw 6. The teeth 8,9 of the rake protrude out from rake head 7 in two different directions opposite from one another.

Figure 3:
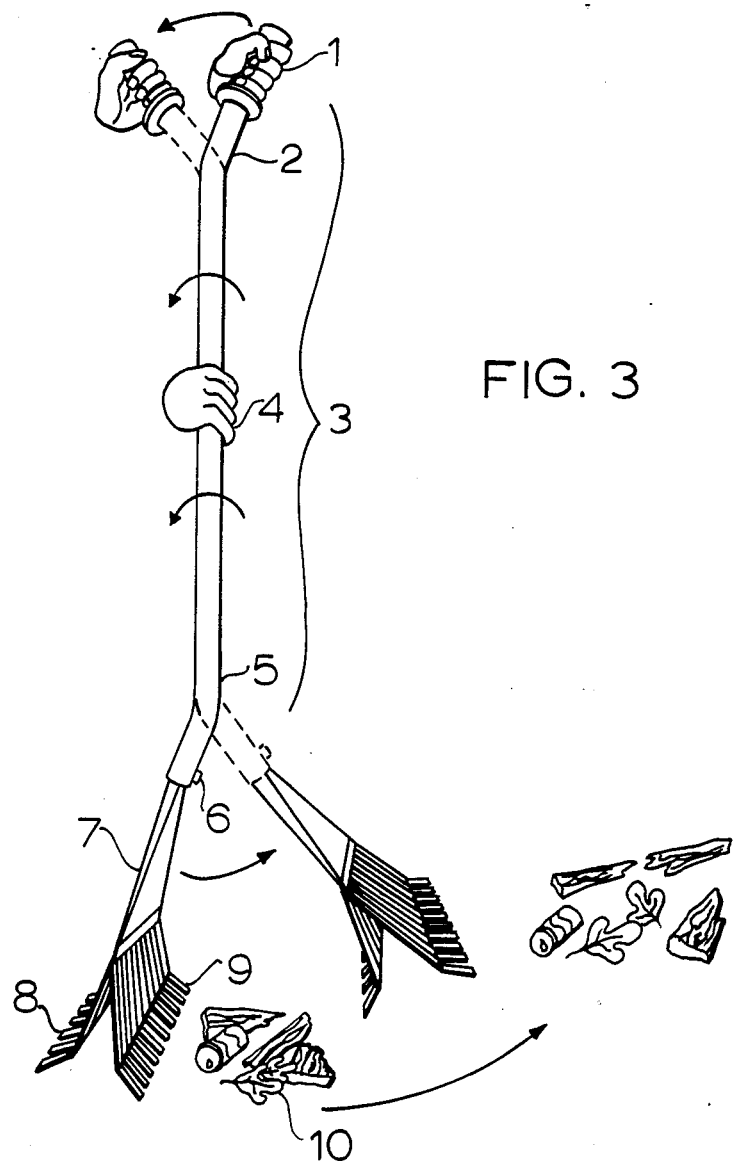
FIG. 3 is a side view of the invention showing its intended sweeping motion.

FIG. 3 illustrates the sweep motion done by holding out the rake in front of one's self, with one hand on handle grip 1 and the other hand in the middle of the handle 3 in area 4. The head of the rake 7, with a row of teeth 8 and 9 (depending on which side of one's self, right or left, a person is raking on) faces out in the same direction of one's self, placing the rake head 7 behind trash, scraps, waste material, etc. 10. By pulling towards one's self with one hand on hand grip 1 and pushing out away from one's self with the other hand in area 4 on handle 3, with the angles 2 and 5 at each end, it causes rake head 7 to move out away from one's self giving it a rotating motion, moving waste materials 10 forward with little effort.

FIGS. 4A and 4B illustrate the purpose of having the two rows of teeth 8 and 9 on the rake head 7, so one can use the rake on either the left side or right side of one's self in a forward sweeping motion by switching hand positions on the handle 3.

Figure 5:
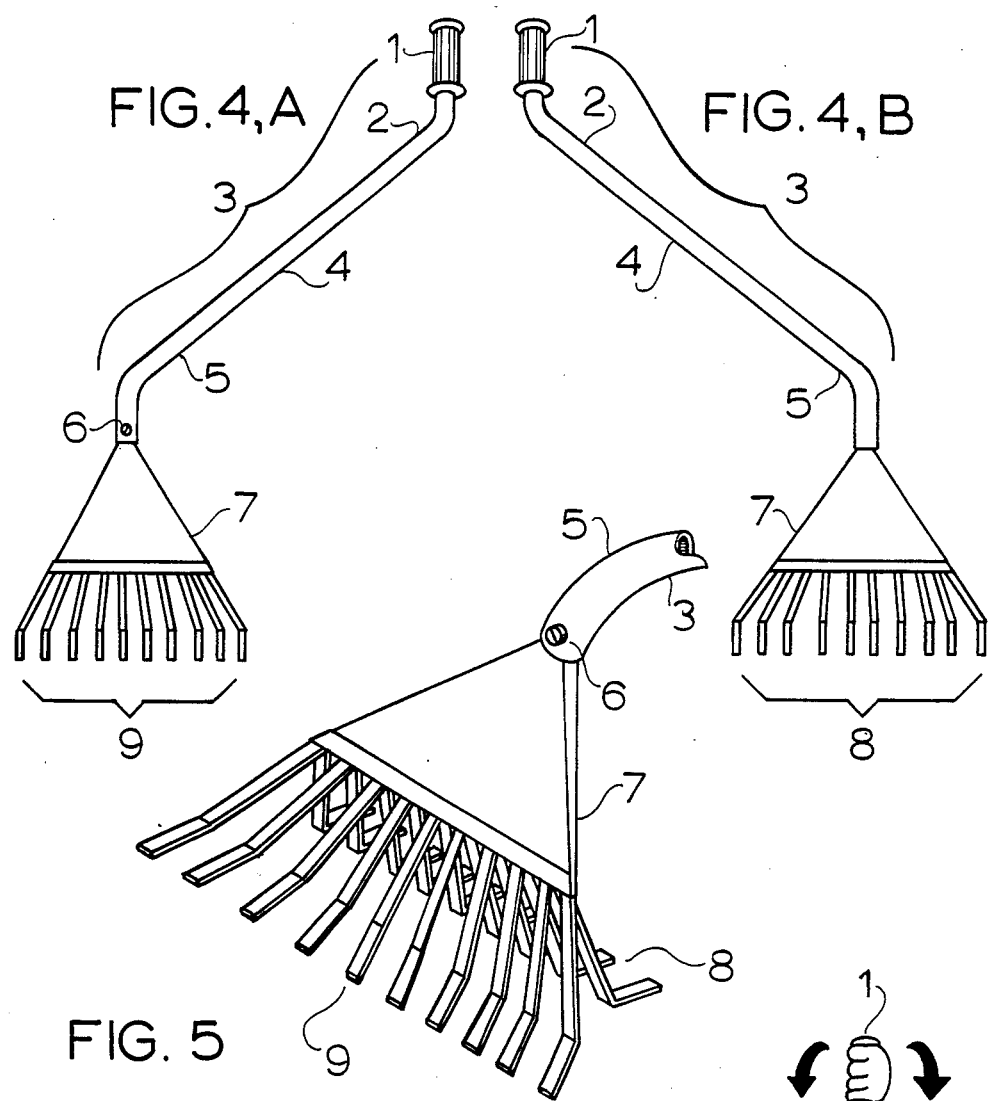
FIG. 5 shows a close-up view of the rake head.

FIG. 5 shows a closeup of the rake head 7 with two rows of teeth 8 and 9 protruding out in opposite directions from one another.

Figure 6:
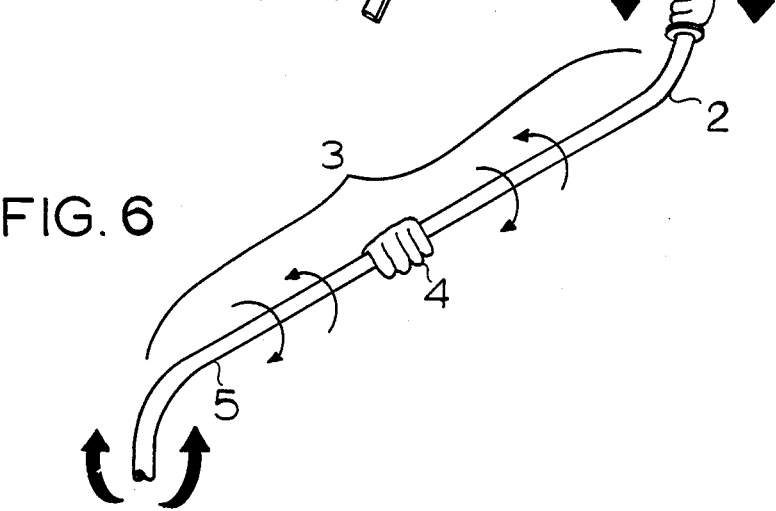
FIG. 6 is a view showing hand placement and handle design.

FIG. 6 shows the hand placement 1 and 4 and the purpose of the handle design 3 having the two forty-five degree angles 2 and 5 at either end of handle 3 in an opposite direction from one another giving handle 3 an oblong "S" shape so that when one pulls on the handle grip 1 with one hand and pushes with the other hand in area 4 on the handle 3, the handle 3 turns in the hand in area 4 and the rake head end of the handle 3 below curve 5 turns out forward.

Figure 7:
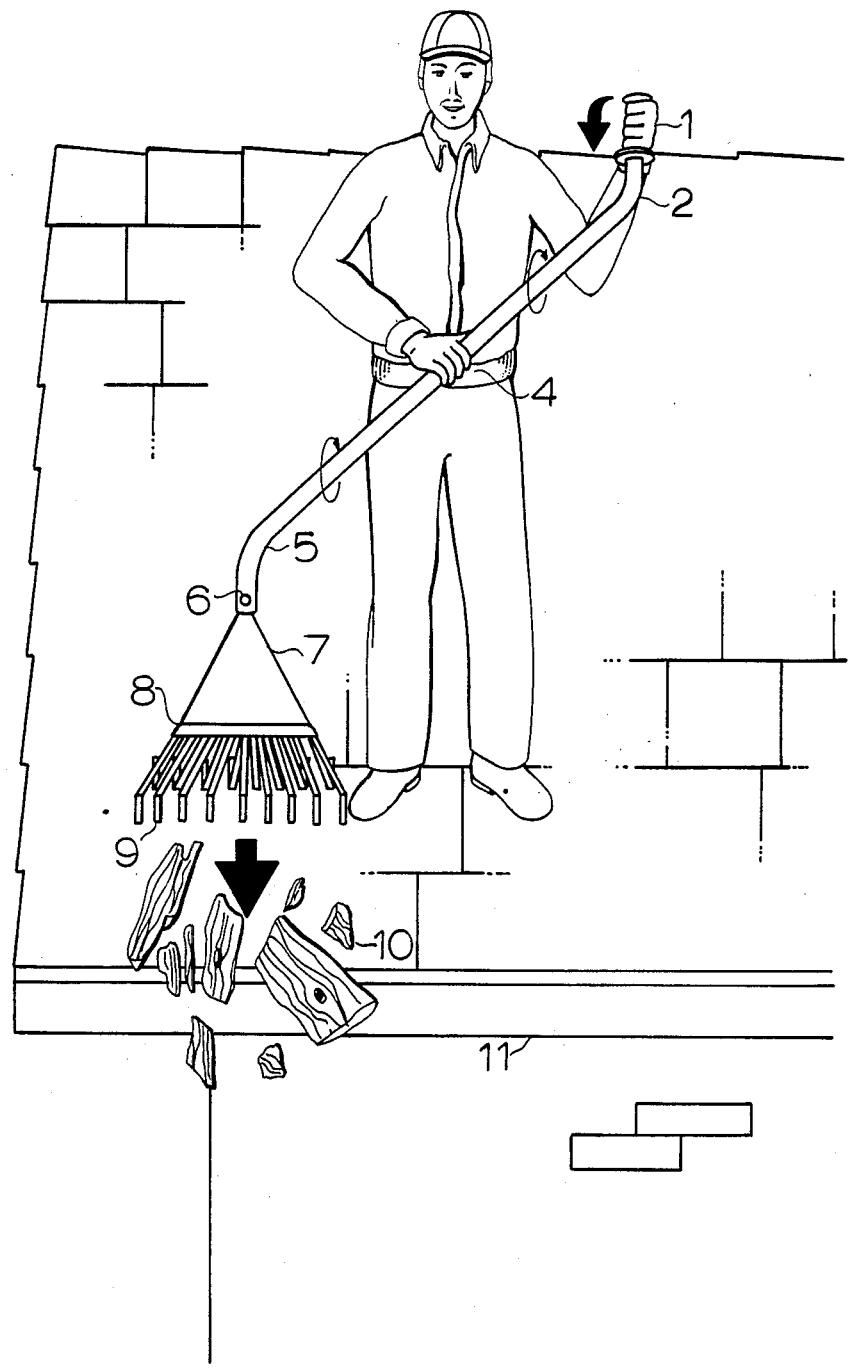
FIG. 7 is an illustration of the invention in use.

FIG. 7 shows the invention in the use in which it was designed. By using the hand control method in FIG. 6, FIG. 7 shows that having the specially designed handle 3 with the curves 2 and 5 allows a person to clear off a roof of scraps, old shingles waste materials etc. 10 off a roof quite efficiently without having to put one's back to the edge of the roof 11.

I claim:
1. A reversible raking device comprising:
an elongated rigid handle having a substantially straight intermediate portion and oppositely curved upper and lower end portions defining an oblong S-shape; a hand grip provided on said upper end portion; and
a rake head attached to said lower end portion; said rake head including a plurality of teeth arranged in two adjacent rows; each of said teeth having a downwardly extending portion and a free end portion; the free end portions of said teeth of one row extending laterally outwardly in an opposite direction from said teeth of the other row;
whereby said device enables a user to rake material on either the left or right side of said user in a forward sweeping type motion by grasping said intermediate portion and said hand grip to provide a rotating motion of said rake head.

* * * * *